(12) United States Patent
Yang et al.

(10) Patent No.: US 10,154,559 B1
(45) Date of Patent: Dec. 11, 2018

(54) CONTROL CIRCUIT AND CONTROL METHOD FOR DETECTING CONFIGURATION CHANNEL LINE AND DRIVING LIGHT EMITTING UNIT ACCORDINGLY

(71) Applicant: WELTREND SEMICONDUCTOR INC., Hsinchu (TW)

(72) Inventors: Chih-Sheng Yang, Hsinchu (TW); Jeng-Cheng Liu, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 16/034,367

(22) Filed: Jul. 13, 2018

(30) Foreign Application Priority Data

Jan. 2, 2018 (TW) .............................. 107100071 A (51) Int. Cl.
*H05B 37/00* (2006.01)
*H05B 33/08* (2006.01)
*H02J 7/00* (2006.01)

(52) U.S. Cl.
CPC ........ *H05B 33/0854* (2013.01); *H02J 7/0047* (2013.01); *H02J 7/0052* (2013.01); *H05B 33/0818* (2013.01); *H02J 7/0045* (2013.01); *H02J 2007/0062* (2013.01)

(58) Field of Classification Search
CPC ...... H02J 7/0047; H02J 7/0052; H02J 7/0045; H02J 2007/0062; H05B 33/0818; H05B 33/0854
USPC .......................................................... 315/211
See application file for complete search history.

(56) References Cited

U.S. PATENT DOCUMENTS

| | | | |
|---|---|---|---|
| 2004/0071410 A1* | 4/2004 | Ma ...................... | H01R 13/6641 385/88 |
| 2005/0124209 A1* | 6/2005 | Currie ................ | H01R 13/7172 439/490 |
| 2010/0182262 A1* | 7/2010 | Yoshikawa ........... | G06F 1/1601 345/173 |
| 2013/0065444 A1* | 3/2013 | Bushnell .............. | H01R 13/631 439/620.22 |
| 2013/0207455 A1* | 8/2013 | Doljack ................ | H02J 7/0036 307/9.1 |
| 2015/0373811 A1* | 12/2015 | Dunser .............. | H05B 33/0815 315/185 R |
| 2017/0372787 A1* | 12/2017 | Chung ................... | G05B 11/01 |
| 2018/0019585 A1* | 1/2018 | Koga ................... | H02H 1/0007 |

(Continued)

*Primary Examiner* — Don Le
(74) *Attorney, Agent, or Firm* — Winston Hsu (57) ABSTRACT

A control circuit includes a first control unit, a power unit, a driver unit, a second control unit, a power source, a first switch, a pull-up element and a second switch. The first control unit is used to detect whether a configuration channel line has a predetermined divided voltage and generate a control signal accordingly. The power unit is coupled to the configuration channel line and a power line for supplying power to the driver unit. The driver unit is used to enable or disable a light emitting unit according to the control signal. The second control unit is used to detect whether the configuration channel line has the predetermined divided voltage and control the first switch and the second switch accordingly. The first switch is coupled between a power source and the configuration channel line. The second switch is coupled between the pull-up element and the configuration channel line.

10 Claims, 8 Drawing Sheets

(56) References Cited

U.S. PATENT DOCUMENTS

| | | | |
|---|---|---|---|
| 2018/0027330 A1* | 1/2018 | Rand | G06F 13/387 |
| 2018/0069395 A1* | 3/2018 | Morii | G01R 31/42 |
| 2018/0183546 A1* | 6/2018 | Kim | H04L 1/0061 |
| 2018/0241096 A1* | 8/2018 | Kaechi | H01M 10/44 |
| 2018/0275732 A1* | 9/2018 | Chen | G06F 1/263 |

\* cited by examiner

CONTROL CIRCUIT AND CONTROL METHOD FOR DETECTING CONFIGURATION CHANNEL LINE AND DRIVING LIGHT EMITTING UNIT ACCORDINGLY

BACKGROUND OF THE INVENTION

1. Field of the Invention

The present application is related to a control circuit and a control method, and more particularly, a control circuit and a control method used for detecting a configuration channel line and driving a light emitting unit accordingly.

2. Description of the Prior Art

Figure 1:
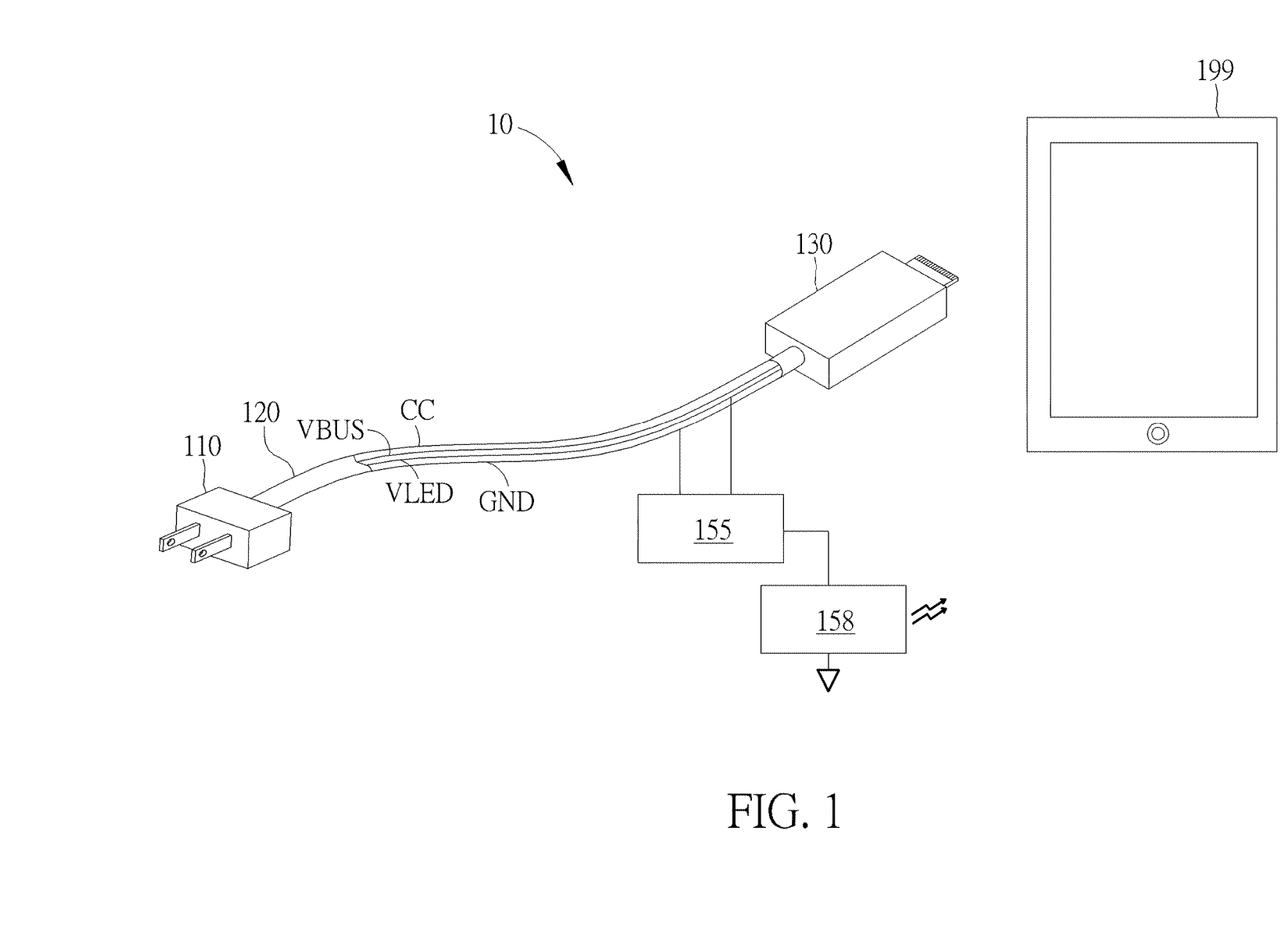
FIG. 1 illustrates a to-be-charged device and a charge interface device according to prior art.

When charging an electrical device (e.g. a mobile phone or a tablet computer), an often used solution is to charge the electrical device via an interface with charging function. For example, interfaces being compatible with USB (universal serial bus) Type-C have been getting more and more popular. FIG. 1 illustrates a to-be-charged device 199, and a charge interface device 10 being compatible with a USB Type-C interface. The charge interface device 10 includes an adapter terminal 110, a cord 120 and a plug terminal 130. The adapter terminal 110 can be coupled to an electrical socket such as a socket providing mains electricity. The cord 120 can transfer electricity, and the plug terminal 130 can be inserted into the to-be-charged device 199.

For better user experience, the charge interface device 10 can further include a control circuit 155 and a light emitting unit 158. When the adapter terminal 110 is coupled to an electrical socket and the plug terminal 130 has not been coupled to the to-be-charged device 199, the control circuit 155 can drive the light emitting unit 158 to emit light for notifying a user that the charge interface device 10 is able to charge other device.

For the above mentioned purpose, it is necessary to supply power to the control circuit 155. According to the specification, a USB Type-C interface can include a power line VBUS, a configuration channel line CC and a ground line GND. The power line VBUS can have a specific voltage, so the power line VBUS can be used to provide electricity. However, it is difficult to provide electricity to the control circuit 155 by means of the power line VBUS. The reason is that the power line VBUS cannot have a suitable voltage and power supply ability when the plug terminal 130 is not coupled to the to-be-charged device 199, and the power line VBUS can have a suitable voltage and power supply ability after the plug terminal 130 is coupled to the to-be-charged device 199.

Hence, when the adapter terminal 110 is coupled to an electrical socket, and the plug terminal is not yet coupled to the to-be-charged device 199, it is necessary to install a light power line VLED in the charge interface device 10 and couple the light power line VLED to the control circuit 155 as shown in FIG. 1 for the light emitting unit 158 to emit light. The light power line VLED can have a power and power supply ability after the adapter terminal 110 is coupled to an electrical socket so as to supply power to the driver unit 155. The additional light power line VLED becomes indispensable when using the above solution.

SUMMARY OF THE INVENTION

An embodiment of the present application provides a control circuit including a first control unit, a power unit, a driver unit, a second control unit, a voltage source, a first switch, a pull-up element and a second switch. The first control unit includes a first terminal coupled to a configuration channel line of a universal serial bus, and an output terminal configured to output a control signal, wherein the first control unit is configured to detect whether the configuration channel line has a predetermined divided voltage and generate the control signal accordingly. The power unit includes a first terminal coupled to a power line of the universal serial bus, a second terminal coupled to the configuration channel line, and an output terminal. The driver unit includes an input terminal coupled to the output terminal of the power unit, a control terminal coupled to the output terminal of the first control unit and configured to receive the control signal, and a first output terminal coupled to a light emitting unit, wherein the driver unit is configured to enable or disable the light emitting unit according to the control signal. The second control unit includes an input terminal coupled to the configuration channel line, a first output terminal configured to output a first operation signal, and a second output terminal configured to output a second operation signal, wherein the second control unit is configured to detect whether the configuration channel line has the predetermined divided voltage and generate the first operation signal and the second operation signal accordingly. The first switch includes a first terminal coupled to the voltage source and configured to receive a voltage, a second terminal coupled to the configuration channel line, and a control terminal coupled to the first output terminal of the second control unit. The second switch includes a first terminal coupled to the pull-up element, a second terminal coupled to the configuration channel line, and a control terminal coupled to the second output terminal of the second control unit.

Another embodiment of the present application provides a control method for controlling a control circuit. The control circuit includes a first control unit coupled to a configuration channel line of a universal serial bus, a driver unit coupled to an output terminal of a first control unit, a first switch coupled between a voltage source and the configuration channel line, a second switch coupled between a pull-up element and the configuration channel line, and a second control unit coupled to the configuration channel line, a control terminal of the first switch and a control terminal of the second switch. The control method includes detecting whether the configuration channel line has a predetermined divided voltage by the first control unit and the second control unit; and controlling the driver unit to enable a light emitting unit by the first control unit, and turning off the first switch and turning on the second switch by the second control unit when the configuration channel line is detected to have the predetermined divided voltage.

Another embodiment of the present application provides a control method for controlling a control circuit. The control circuit includes a first control unit coupled to a configuration channel line of a universal serial bus, a driver unit coupled to an output terminal of a first control unit, a first switch coupled between a voltage source and the configuration channel line, a second switch coupled between a pull-up element and the configuration channel line, and a second control unit coupled to the configuration channel line, a control terminal of the first switch and a control terminal of the second switch. The control method includes detecting whether the configuration channel line has a predetermined divided voltage by the first control unit and the second control unit; and the control circuit entering a first mode and a second mode periodically when the configuration channel line is not detected to have the predetermined divided voltage. In the first mode, the first control unit controls the driver unit to disable a light emitting unit, and the second control unit turns off the first switch and turns on the second switch. In the second mode, the first control unit controls the driver unit to enable the light emitting unit, and the second control unit turns on the first switch and turns off the second switch.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
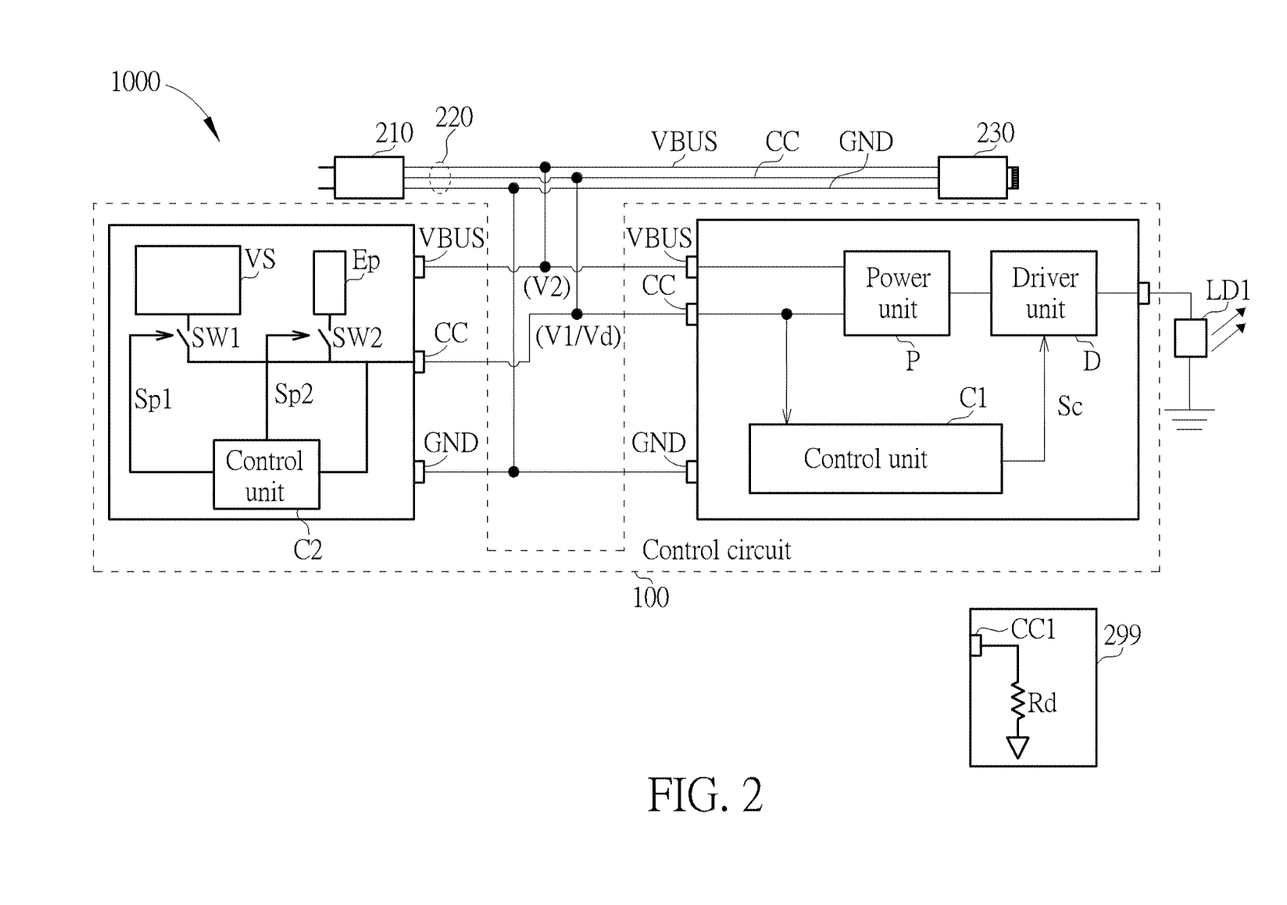
FIG. 2 illustrates a to-be-charged device and a charge interface device according to an embodiment.

FIG. 2 illustrates a charge interface device 1000 and a to-be-charged device 299. The charge interface device 1000 may include an adapter terminal 210, a cord 220, a plug terminal 230, a control circuit 100 and a light emitting unit LD1.

The control circuit 100 may include a control unit C1, a power unit P, a driver unit D, a control unit C2, a voltage source VS, a switch SW1, a pull-up element Ep and a switch SW2.

The control unit C1 may include a first terminal coupled to a configuration channel line CC of a universal serial bus (USB), and an output terminal used to output a control signal Sc. The control unit C1 may be used to detect whether the configuration channel line CC has a predetermined divided voltage Vd and generate the control signal Sc accordingly. The mentioned universal serial bus in this text may be a universal serial bus Type-C or another applicable universal serial bus.

The power unit P may include a first terminal coupled to a power line VBUS of the universal serial bus, a second terminal coupled to the configuration channel line CC, and an output terminal.

The driver unit D may include an input terminal coupled to the output terminal of the power unit P, a control terminal coupled to the output terminal of the control unit C1 and used to receive the control signal Sc, and an output terminal coupled to the light emitting unit LD1. The driver unit D may enable or disable the light emitting unit LD1 according to the control signal Sc.

The control unit C2 may include an input terminal coupled to the configuration channel line CC, a first output terminal used to output an operation signal Sp1, and a second output terminal used to output an operation signal Sp2. The control unit C2 may detect whether the configuration channel line CC has the predetermined divided voltage Vd and generate the operation signals Sp1 and Sp2 accordingly.

The switch SW1 includes a first terminal coupled to the voltage source VS and used to receive a voltage V1, a second terminal coupled to the configuration channel line CC, and a control terminal coupled to the first output terminal of the control unit C2.

The switch SW2 may include a first terminal coupled to the pull-up element Ep, a second terminal coupled to the configuration channel line CC, and a control terminal coupled to the second output terminal of the control unit C2.

The operation signals Sp1 and Sp2 may have opposite levels if the switches SW1 and SW2 are of an identical type (e.g. a same type of transistor switch).

As shown in FIG. 2, the to-be-charged device 299 may have a port CC1, and a pull-down resistor Rd coupled to the port CC1. When the plug terminal 230 is coupled to the to-be-charged device 299, the port CC1 may be coupled to the configuration channel line CC. Under this condition, if the switch SW2 is turned on, the pull-up element Ep and the pull-down resistor Rd may form a path of dividing voltage so that the configuration channel line CC may have the predetermined divided voltage Vd. In other words, when the configuration channel line CC has the predetermined divided voltage Vd, it may be determined that the plug terminal 230 is coupled to the to-be-charged device 299 accordingly.

The control unit C1 may further include a second terminal coupled to the power line VBUS, and the control unit C1 may be further used to detect whether the power line VBUS has a voltage V2. It may be determined that the plug terminal 230 has been coupled to the to-be-charged device 299 when it is detected that the configuration channel line CC has the predetermined divided voltage Vd and the power line VBUS has the voltage V2.

Figure 3:
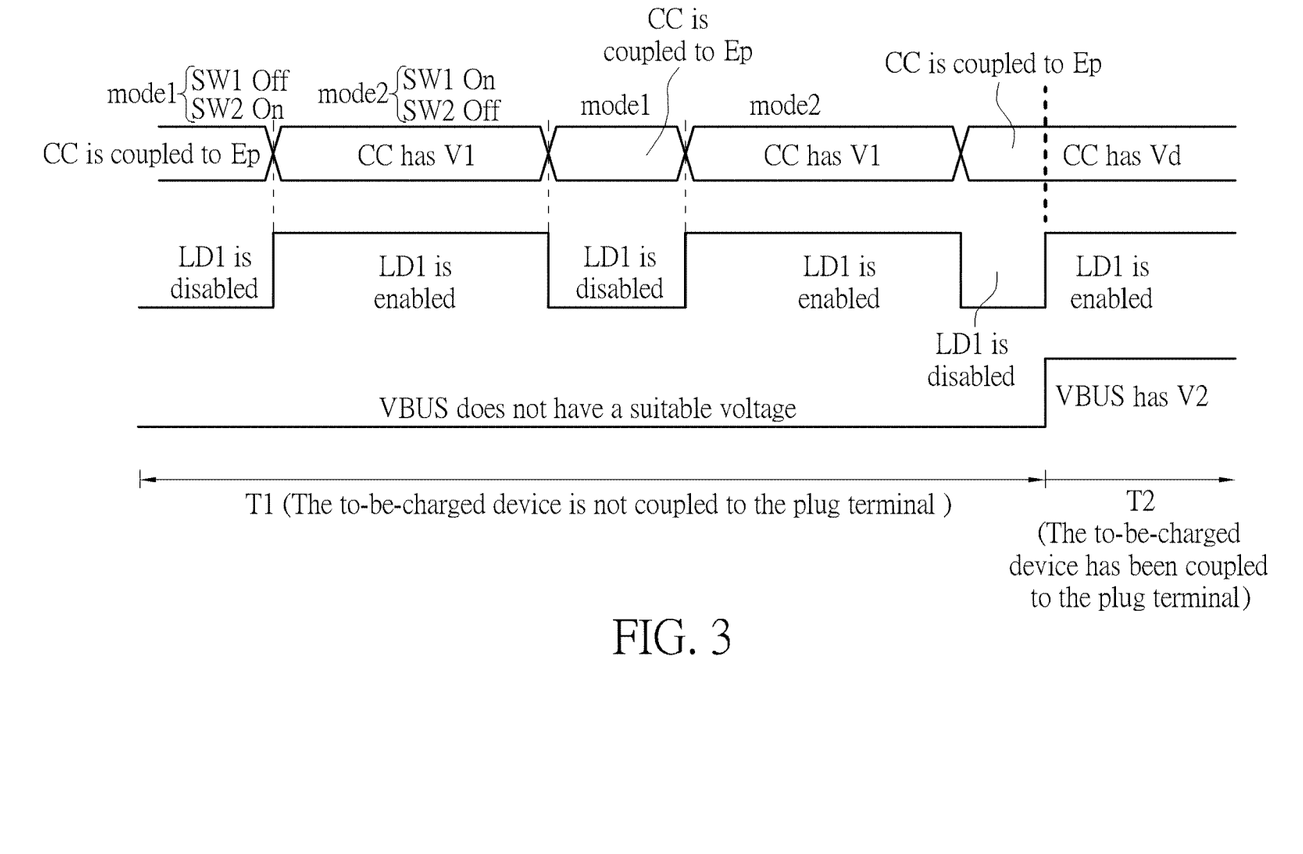
FIG. 3 illustrates an operation diagram of the to-be-charged device and the charge interface of FIG. 2.

FIG. 3 illustrates an operation diagram of the charge interface device 1000 and the to-be-charged device 299 of FIG. 2. During the time interval T1, the adapter terminal 210 is coupled to an electrical socket, but the plug terminal 230 is not yet coupled to the to-be-charged device 299. During the time interval T2, the adapter terminal 210 is coupled to an electrical socket, and the plug terminal 230 is coupled to the to-be-charged device 299.

As shown in FIG. 2 and FIG. 3, during the time interval T1, the control circuit 100 may enters modes mode1 and mode2 periodically.

In mode mode1, the control signal Sc may control the driver unit D to disable the light emitting unit LD1. The operation signal Sp1 may turn off the switch SW1. The operation signal Sp2 may turn on the switch SW2. As described above, when the switch SW2 is turned on, the pull-up element Ep may be coupled to the configuration channel line CC, the control units C1 and C2 may be used to detect whether the configuration channel line CC has the predetermined divided voltage Vd. When detecting the configuration channel line CC has the predetermined divided voltage Vd, it is determined that the plug terminal 230 is coupled to the to-be-charged device 299; otherwise, it is determined that the plug terminal 230 is not coupled to the to-be-charged device 299. Hence, in mode mode1, it is allowed to detect if the plug terminal 230 is coupled to the to-be-charged device 299.

In mode mode2, the operation signal Sp1 may turn on the switch SW1, and the operation signal Sp2 may turn off the switch SW2. The voltage source VS may provide the voltage V1 to the configuration channel line CC via the switch SW1, and the voltage V1 may be provided to the second terminal of the power unit P via the configuration channel line CC. Hence, the voltage V1 may be provided from the output terminal of the power unit P, and the driver unit D may supply power to the light emitting unit LD1. The driver unit D may supply power by outputting a constant current, for example. The control signal Sc may control the driver unit D to enable the light emitting unit LD1. In other words, in mode mode2, power may be provided to the light emitting unit LD1 via the switch SW1 and the configuration channel line CC so as to emit indication light.

It may be detected whether the charge interface device 1000 is coupled to the to-be-charged device 299 in mode mode1, and the indication light may be emitted in mode mode2. Since a frequency of switching between modes mode1 and mode2 may be tens or even hundreds of hertz, the indication light may be seen to be emitted constantly. Hence, the to-be-charged device 299 may be detected, and the indication light may also be emitted when the adapter terminal 210 is coupled to an electrical socket, and the plug terminal 230 is not yet coupled to the to-be-charged device 299, that is, the time interval T1. It is therefore allowed to notify a user that a charge interface device can be used to charge without embedding an additional light power line.

When the plug terminal 230 is coupled to the to-be-charged device 299, it may enter the time interval T2. On the boundary of the time intervals T1 and T2, the control units C1 and C2 detect that the configuration channel line CC has the predetermined divided voltage Vd. When the predetermined divided voltage Vd is detected, the operation signal Sp1 may turn off the switch SW1, so the configuration channel line CC stops having the voltage V1. The operation signal Sp2 may turn on the switch SW2, so the configuration channel line CC may be constantly coupled to the pull-up element Ep during the time interval T2. After the plug terminal 230 is coupled to the to-be-charged device 299, the power line VBUS may have the voltage V2 and power supply ability. The first terminal of the power unit P may receive the voltage V2 from the power line VBUS, the voltage V2 may be provided from the output terminal of the power unit P to the driver unit D, and the driver unit D may be able to supply power to the light emitting unit LD1. The driver unit D may supply power by outputting a constant current, for example. The control signal Sc may control the driver unit D to enable the light emitting unit LD1. In other words, during the time interval T2, the light emitting unit LD1 may emit indication light. Table 1 may be referred to with the above description.

TABLE 1

| During the time interval T1, the charge interface device 1000 is not coupled to the to-be-charged device 299. | The light emitting unit LD1 emits light. |
|---|---|
| During the time interval T2, the charge interface device 1000 is coupled to the to-be-charged device 299. | The light emitting unit LD1 emits light. |

Figure 4:
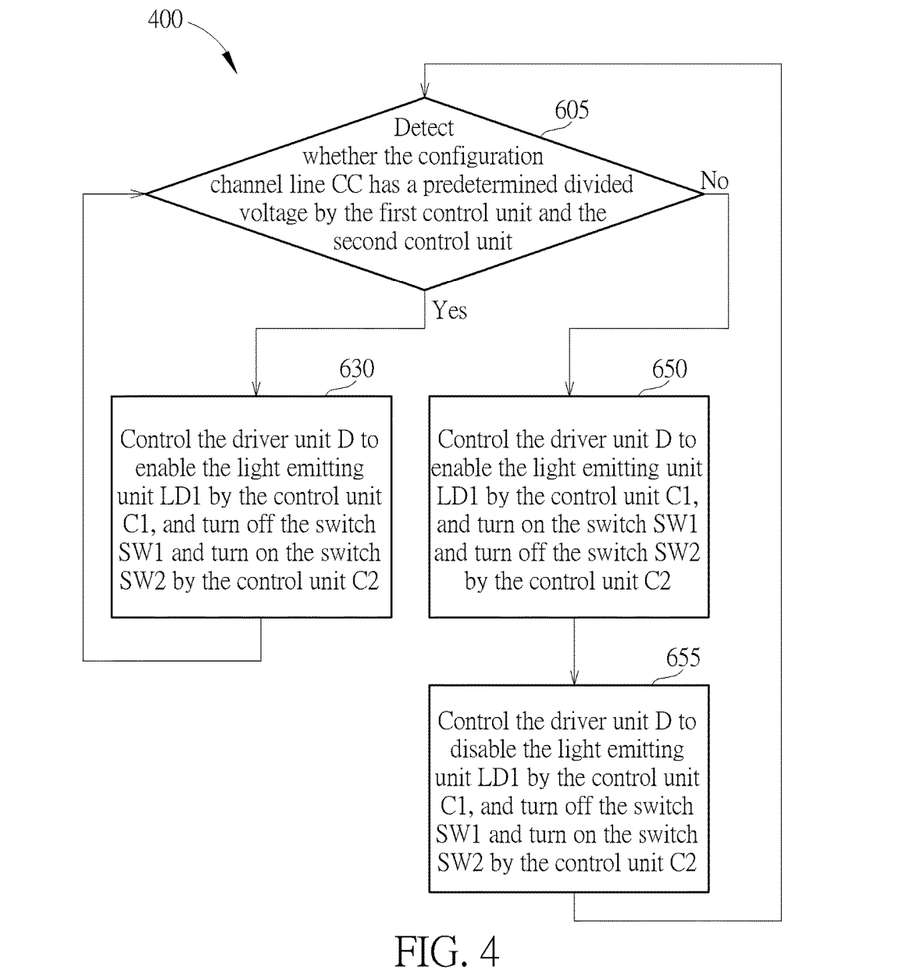
FIG. 4 illustrates a flowchart of a control method according to FIG. 2 and FIG. 3.

FIG. 4 illustrates a flowchart of a control method 400 corresponding to FIG. 2 and FIG. 3. The control method 400 may include the following steps.

Step 605: Detect whether the configuration channel line CC has a predetermined divided voltage by the first control unit and the second control unit; if so, enter Step 630; otherwise, enter Step 650;

Step 630: Control the driver unit D to enable the light emitting unit LD1 by the control unit C1, and turn off the switch SW1 and turn on the switch SW2 by the control unit C2; enter Step 605;

Step 650: Control the driver unit D to enable the light emitting unit LD1 by the control unit C1, and turn on the switch SW1 and turn off the switch SW2 by the control unit C2; and Step 655: Control the driver unit D to disable the light emitting unit LD1 by the control unit C1, and turn off the switch SW1 and turn on the switch SW2 by the control unit C2; enter Step 605.

Figure 5:
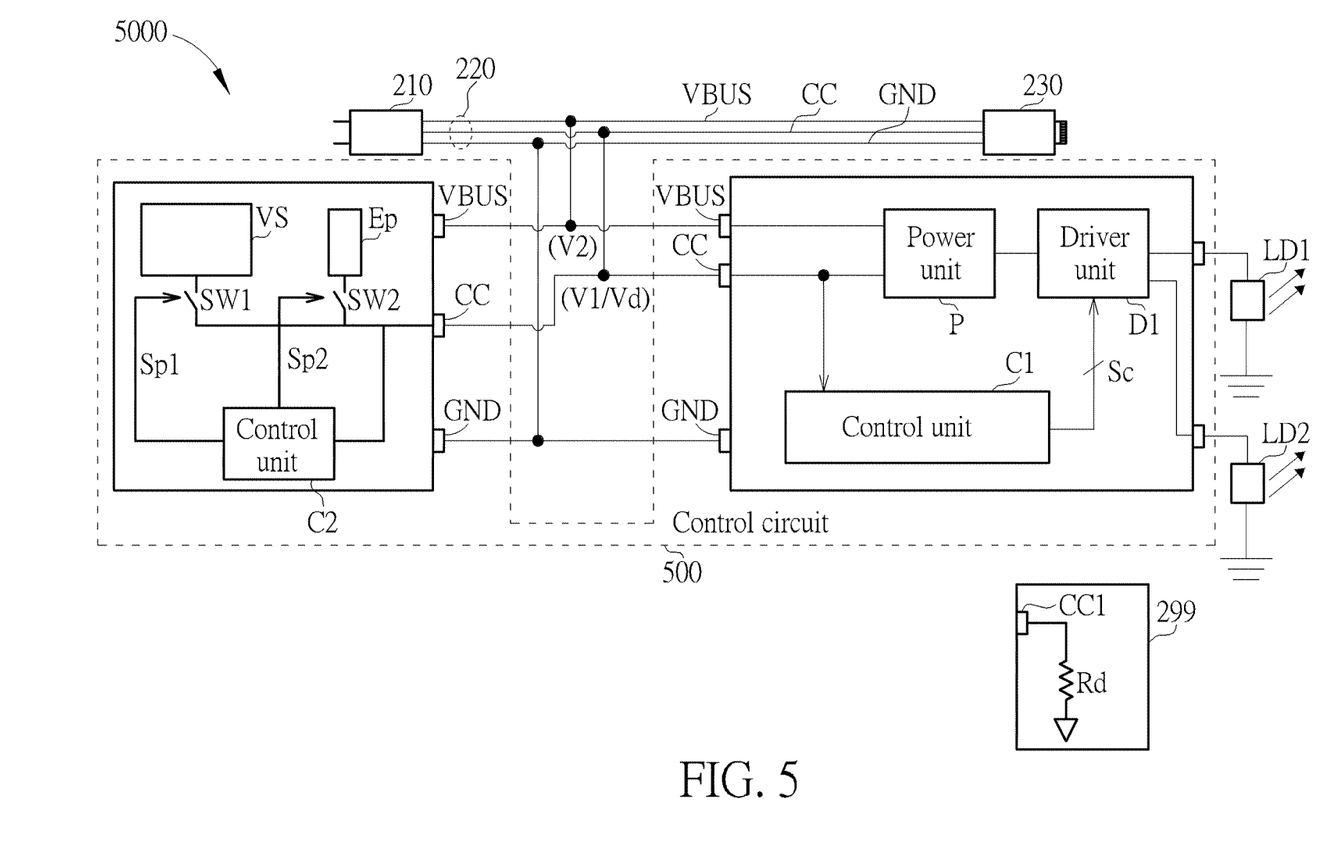
FIG. 5 illustrates a to-be-charged device and a charge interface device according to another embodiment.

FIG. 5 illustrates a charge interface device 5000 and the to-be-charged device 299. The charge interface device 5000 may include an adapter terminal 210, a cord 220, a plug terminal 230, a control circuit 500 and light emitting units LD1 and LD2. The similarities of the control circuits 500 and 100 (of FIG. 2) are not described repeatedly. A driver unit D1 of the control circuit 500 may have two output terminals coupled to the light emitting units LD1 and LD2 respectively. The driver unit D1 may enable or disable the light emitting units LD1 and LD2 according to the control signal Sc.

Figure 6:
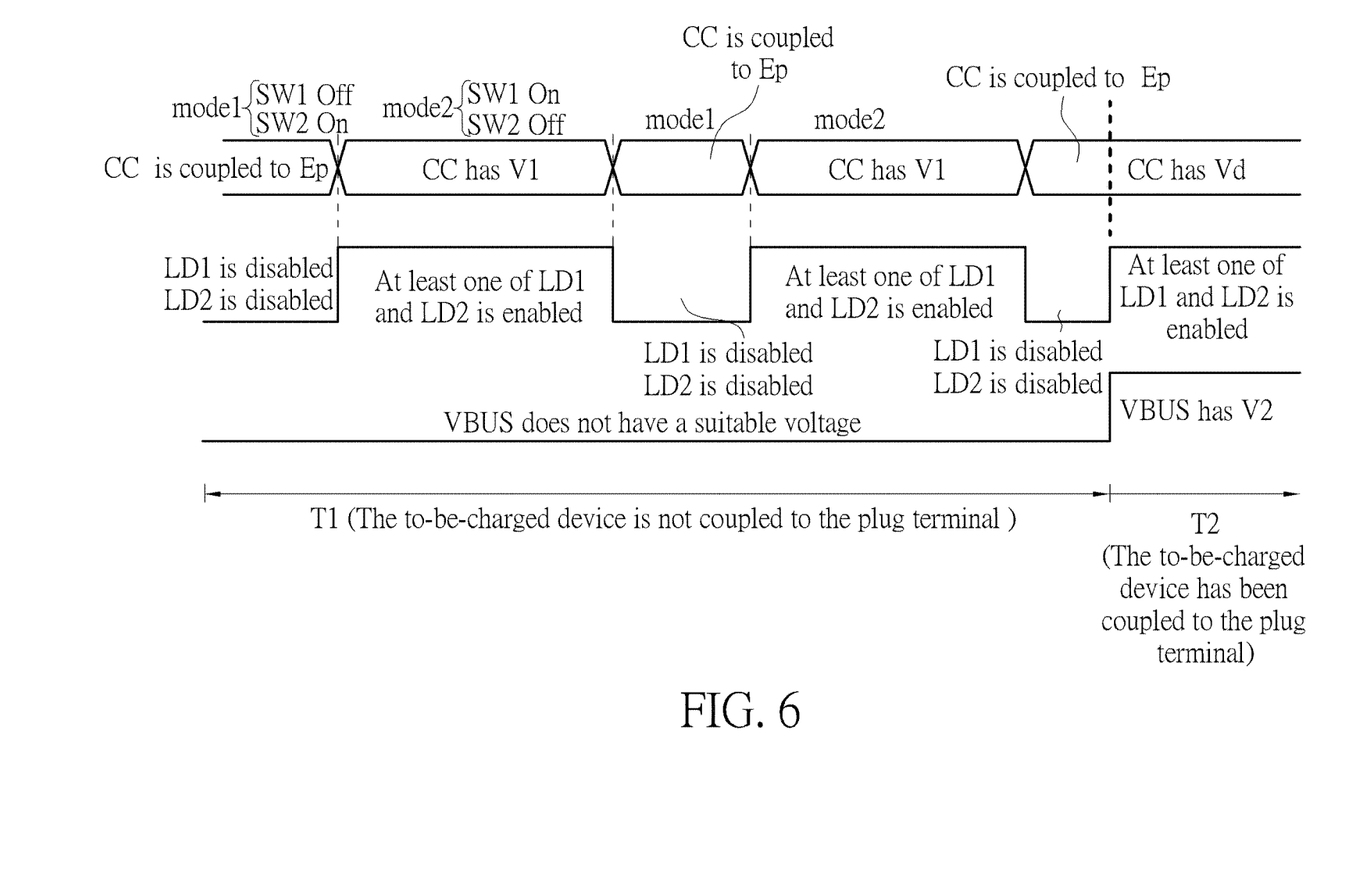
FIG. 6 illustrates an operation diagram of the to-be-charged device and the charge interface of FIG. 5.

FIG. 6 illustrates an operation diagram of FIG. 5. Like FIG. 3, during the time interval T1 of FIG. 6, the adapter terminal 210 is coupled to an electrical socket, but the plug terminal 230 is not yet coupled to the to-be-charged device 299, so the configuration channel line CC does not have the predetermined divided voltage Vd. During the time interval T2, the adapter terminal 210 is coupled to an electrical socket, and the plug terminal 230 is also coupled to the to-be-charged device 299, so the configuration channel line CC has the predetermined divided voltage Vd. During the time interval T1, the control circuit 500 may enter the modes mode1 and mode2 periodically. In the mode mode1, the switch SW1 is turned off and the switch SW2 is turned on. In the mode mode2, the switch SW1 is turned on and the switch SW2 is turned off.

What is different from FIGS. 2-3 to FIG. 5 is about the control of the light emitting units. The control signal Sc of FIG. 5 may disable the light emitting units LD1 and LD2 in the mode mode1. The control signal Sc of FIG. 5 may enable the light emitting unit LD1 in the mode mode2. During the time interval T2, the control signal Sc of FIG. 5 may enable the light emitting units LD1 and LD2. The control may be as shown in table 2.

According to another embodiment, during the time interval T2, the control signal Sc may disable the light emitting unit LD1 and enable the light emitting unit LD2 as shown in table 3.

TABLE 2

| During the time interval T1 | Only the light emitting unit LD1 emits light. |
|---|---|
| During the time interval T2 | Both the light emitting units LD1 and LD2 emit light. |

TABLE 3

| During the time interval T1 | Only the light emitting unit LD1 emits light. |
| --- | --- |
| During the time interval T2 | Only the light emitting unit LD2 emits light. |

In other words, during the time intervals T1 and T2, indication light is visible to a user.

Brighter indication light may be emitted during the time interval T2 than during the time interval T1 as shown in Table 2. According to another embodiment, different colors may be used on the light emitting units LD1 and LD2. A user may therefore be notified that she is allowed to charge a device when seeing yellow light, and be notified that the charge interface device is correctly coupled to the to-be-charged device after coupling the to-be-charged device 299 and seeing green light. The above mentioned colors are merely used as examples.

Since the control signal Sc of FIG. 5 may be used to control the driver unit D so as to enable or disable at least one or both of the light emitting units LD1 and LD2, the control signal Sc may include multiple bits. For example, the control signal Sc may be a 2-bit signal. In another embodiment, the control signal Sc may include multiple voltage levels.

Figure 7:
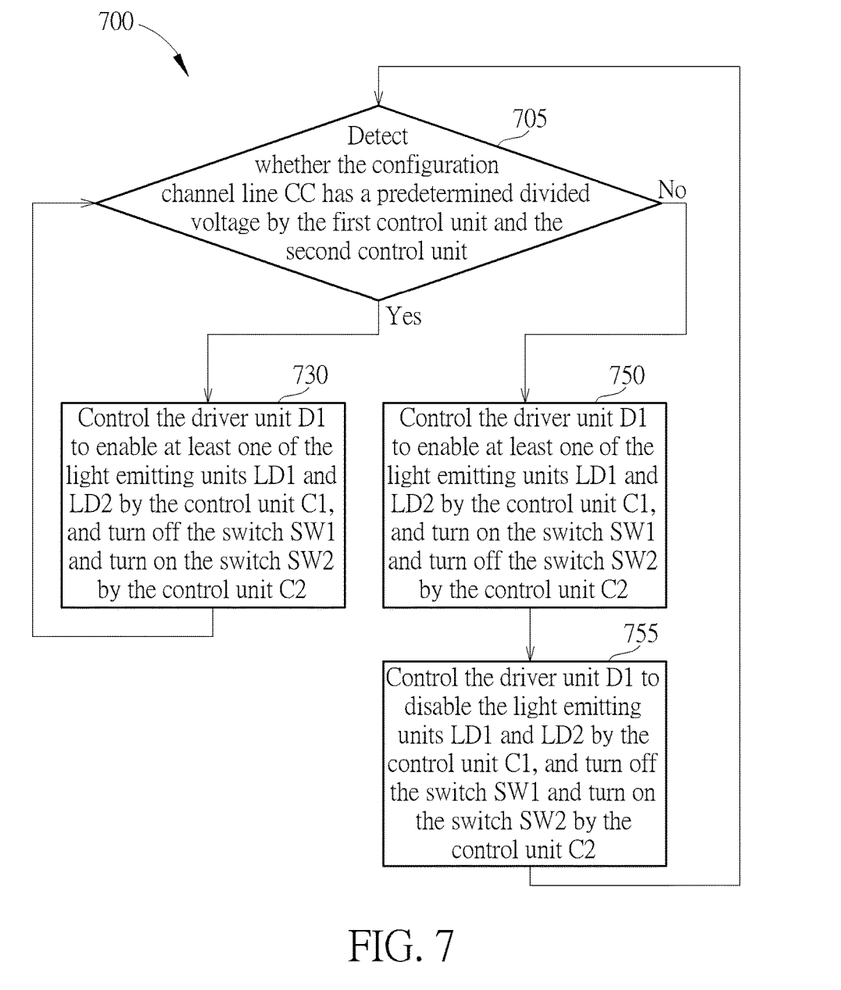
FIG. 7 illustrates a flowchart of a control method according to FIG. 5 and FIG. 6.

FIG. 7 illustrates a flowchart of a control method 700 of FIG. 5 and FIG. 6. The control method 700 may include the following steps.

Step 705: Detect whether the configuration channel line CC has a predetermined divided voltage by the first control unit and the second control unit; if so, enter Step 730; otherwise, enter Step 750;

Step 730: Control the driver unit D1 to enable at least one of the light emitting units LD1 and LD2 by the control unit C1, and turn off the switch SW1 and turn on the switch SW2 by the control unit C2; enter Step 705;

Step 750: Control the driver unit D1 to enable at least one of the light emitting units LD1 and LD2 by the control unit C1, and turn on the switch SW1 and turn off the switch SW2 by the control unit C2; and Step 755: Control the driver unit D1 to disable the light emitting units LD1 and LD2 by the control unit C1, and turn off the switch SW1 and turn on the switch SW2 by the control unit C2; enter Step 705.

In Steps 730 and 750, the light emitting units LD1 and LD2 may be configured to have different light settings as shown in Table 2 and Table 3 for distinguishable visual effects.

Figure 8:
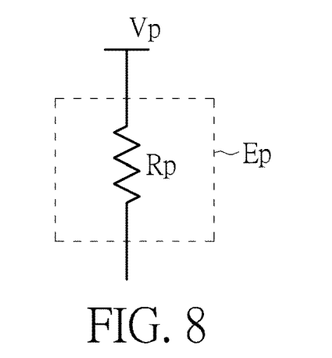
FIG. 8 illustrates the pull-up element of FIG. 2 and FIG. 5 according to an embodiment.

FIG. 8 illustrates the pull-up element Ep of FIG. 2 and FIG. 5. The pull-up element Ep may include a pull-up resistor Rp. The pull-up resistor Rp may be coupled between a pull-up voltage source Vp and the configuration channel line CC. When the to-be-charged device 299 is coupled to the plug terminal 230, the predetermined divided voltage Vd may be generated.

Figure 9:
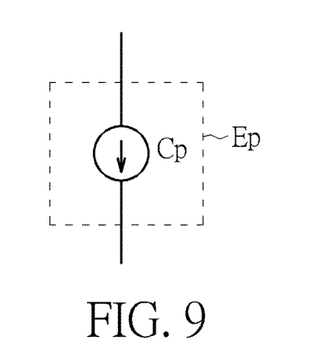
FIG. 9 illustrates the pull-up element of FIG. 2 and FIG. 5 according to another embodiment.

FIG. 9 illustrates the pull-up element Ep of FIG. 2 and FIG. 5 according to another embodiment. The pull-up element Ep may include a pull-up current source Cp. When the to-be-charged device 299 is coupled to the plug terminal 230, the predetermined divided voltage Vd may be generated because of a change of current. Other appropriate sorts of pull-up elements may be used according to embodiments.

Figure 10:
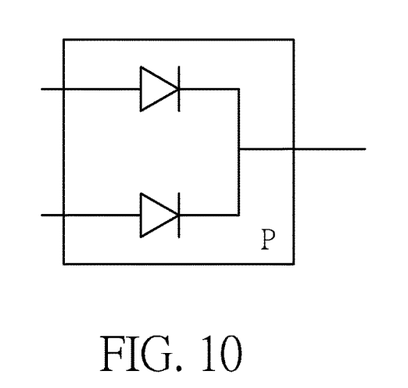
FIG. 10 illustrates an internal structure of the power unit of FIG. 2 and FIG. 5.

FIG. 10 illustrates an internal structure of the power unit P of FIG. 2 and FIG. 5. The two input terminals of the power unit P may be coupled to the power line VBUS and the configuration channel line CC. As described above, the power line VBUS may provide the voltage V1, and the configuration channel line CC may provide the voltage V2. For preventing that the voltages provides by the power line VBUS and the configuration channel line CC interfering with one another, components with diode function may be coupled as shown in FIG. 10. FIG. 10 merely illustrates a conceptual diagram instead of limiting details of a circuit.

In FIG. 2 and FIG. 5, at least one of the light emitting units LD1 and LD2 may include a light emitting diode or a series of light emitting diodes. Other suitable light emitting elements may be used to form one or both of the light emitting units LD1 and LD2. The control unit C2, the switches SW1 and SW2, the pull-up element Ep and the voltage source VS may be integrated in the adapter terminal 210. The control unit C1, the power unit P, the driver unit D and D1, and the light emitting units LD1 and LD2 may be integrated in the adapter terminal 210, the cord 220 or the plug terminal 230. The configuration may be designed according to product or engineering requirements.

In summary, the control circuit and the control method provided by embodiments can realize that a user may be notified when a charge interface device is able to charge another device or a to-be-charged device is being charged by emitting indication light without needing an additional light power line. It is beneficial for improving user experience and alleviating engineering problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit comprising:
    a first control unit comprising a first terminal coupled to a configuration channel line of a universal serial bus, and an output terminal configured to output a control signal, wherein the first control unit is configured to detect whether the configuration channel line has a predetermined divided voltage and generate the control signal accordingly;
    a power unit comprising a first terminal coupled to a power line of the universal serial bus, a second terminal coupled to the configuration channel line, and an output terminal;
    a driver unit comprising an input terminal coupled to the output terminal of the power unit, a control terminal coupled to the output terminal of the first control unit and configured to receive the control signal, and a first output terminal coupled to a first light emitting unit, wherein the driver unit is configured to enable or disable the first light emitting unit according to the control signal;
    a second control unit comprising an input terminal coupled to the configuration channel line, a first output terminal configured to output a first operation signal, and a second output terminal configured to output a second operation signal, wherein the second control unit is configured to detect whether the configuration channel line has the predetermined divided voltage and generate the first operation signal and the second operation signal accordingly;
    a voltage source;
    a first switch comprising a first terminal coupled to the voltage source and configured to receive a first voltage, a second terminal coupled to the configuration channel line, and a control terminal coupled to the first output terminal of the second control unit;
a pull-up element; and
a second switch comprising a first terminal coupled to the pull-up element, a second terminal coupled to the configuration channel line, and a control terminal coupled to the second output terminal of the second control unit.

2. The control circuit of claim 1, wherein:
when the first control unit and the second control signal detect that the configuration channel line has the predetermined divided voltage,
the first terminal of the power unit receives a second voltage from the power line,
the control signal controls the driver unit to enable the first light emitting unit,
the first operation signal turns off the first switch,
the second operation signal turns on the second switch, and
the second voltage is provided from the output terminal of the power unit.

3. The control circuit of claim 1, wherein:
when the first control unit and the second control unit detect that the configuration channel line does not have the predetermined divided voltage, the control circuit enters a first mode and a second mode periodically;
wherein:
in the first mode,
the control signal controls the driver unit to disable the first light emitting unit,
the first operation signal turns off the first switch, and the second operation signal turns on the second switch; and
in the second mode,
the second terminal of the power unit receives the first voltage from the configuration channel line,
the control signal controls the driver unit to enable the first light emitting unit,
the first operation signal turns on the first switch,
the second operation signal turns off the second switch, and
the first voltage is provided from the output terminal of the power unit.

4. The control circuit of claim 1, wherein:
the driver unit further comprises a second output terminal coupled to a second light emitting unit, and the driver unit is further configured to enable or disable the second light emitting unit according to the control signal.

5. The control circuit of claim 4, wherein:
when the first control unit and the second control unit detect that the configuration channel line has the predetermined divided voltage,
the first terminal of the power unit receives a second voltage from the power line,
the control signal controls the driver unit to enable at least one of the first light emitting unit and the second light emitting unit,
the first operation signal turns off the first switch,
the second operation signal turns on the second switch, and
the second voltage is provided from the output terminal of the power unit.

6. The control circuit of claim 4, wherein
when the first control unit and the second control unit detect that the configuration channel line does not have the predetermined divided voltage, the control circuit enters a first mode and a second mode periodically;
wherein:
in the first mode,
the control signal controls the driver unit to disable the first light emitting unit and the second light emitting unit,
the first operation signal turns off the first switch, and the second operation signal turns on the second switch; and
in the second mode,
the second terminal of the power unit receives the first voltage from the configuration channel line,
the control signal controls the driver unit to enable the first light emitting unit and/or the second light emitting unit,
the first operation signal turns on the first switch,
the second operation signal turns off the second switch, and
the first voltage is provided from the output terminal of the power unit.

7. The control circuit of claim 1, wherein the first control unit further comprises a second terminal coupled to the power line, and the first control unit is further configured to detect whether the power line has a second voltage.

8. The control circuit of claim 1, wherein the pull-up element comprises a pull-up resistor or a pull-up current source.

9. A control method for controlling a control circuit, the control circuit comprising a first control unit coupled to a configuration channel line of a universal serial bus, a driver unit coupled to an output terminal of a first control unit, a first switch coupled between a voltage source and the configuration channel line, a second switch coupled between a pull-up element and the configuration channel line, and a second control unit coupled to the configuration channel line, a control terminal of the first switch and a control terminal of the second switch, and the control method comprising:
detecting whether the configuration channel line has a predetermined divided voltage by the first control unit and the second control unit; and
controlling the driver unit to enable a light emitting unit by the first control unit, and turning off the first switch and turning on the second switch by the second control unit when the configuration channel line is detected to have the predetermined divided voltage.

10. A control method for controlling a control circuit, the control circuit comprising a first control unit coupled to a configuration channel line of a universal serial bus, a driver unit coupled to an output terminal of a first control unit, a first switch coupled between a voltage source and the configuration channel line, a second switch coupled between a pull-up element and the configuration channel line, and a second control unit coupled to the configuration channel line, a control terminal of the first switch and a control terminal of the second switch, and the control method comprising:
detecting whether the configuration channel line has a predetermined divided voltage by the first control unit and the second control unit; and
the control circuit entering a first mode and a second mode periodically when the configuration channel line is not detected to have the predetermined divided voltage;
wherein:

in the first mode, the first control unit controls the driver unit to disable a light emitting unit, and the second control unit turns off the first switch and turns on the second switch; and in the second mode, the first control unit controls the driver unit to enable the light emitting unit, and the second control unit turns on the first switch and turns off the second switch.

\* \* \* \* \*